United States Patent [19]
Carroll et al.

[11] Patent Number: 5,691,019
[45] Date of Patent: Nov. 25, 1997

[54] FOUL RELEASE SYSTEM

[75] Inventors: Kenneth Michael Carroll, Albany; Owen Maynard Harblin, Clifton Park; Slawomir Rubinsztajn, Schenectady, all of N.Y.

[73] Assignee: General Electric Company, Schenectady, N.Y.

[21] Appl. No.: 432,873

[22] Filed: May 1, 1995

[51] Int. Cl.$^6$ .............................. B08B 17/00; B63B 59/00
[52] U.S. Cl. .................... 428/40.1; 114/357; 428/332; 428/334; 428/335; 428/336; 428/446; 428/447; 428/448; 428/450; 428/451; 428/452; 524/268; 524/269; 525/101; 525/104
[58] Field of Search .................... 428/40, 332, 334, 428/335, 336, 446, 447, 448, 450, 451, 452; 524/268, 269; 525/101, 104; 114/357

[56] References Cited

U.S. PATENT DOCUMENTS

| | | | |
|---|---|---|---|
| 2,843,555 | 7/1958 | Berridge | 260/18 |
| 3,531,424 | 9/1970 | Swanson | 260/18 |
| 3,565,851 | 2/1971 | Neuroth | 260/37 |
| 3,702,778 | 11/1972 | Mueller et al. | 428/447 |
| 3,776,875 | 12/1973 | Getson | 524/474 |
| 4,431,472 | 2/1984 | Hohl et al. | 428/447 |
| 4,637,958 | 1/1987 | Wegehaupt et al. | 428/416 |
| 4,861,670 | 8/1989 | Lampe et al. | 428/447 |
| 4,960,817 | 10/1990 | Spadafora | 524/440 |
| 5,213,617 | 5/1993 | Blizzard | 106/287.13 |
| 5,290,601 | 3/1994 | Brooks et al. | 427/412.4 |
| 5,290,801 | 3/1994 | Brooks | 427/421.4 |
| 5,449,553 | 9/1995 | Griffith | 428/332 |

FOREIGN PATENT DOCUMENTS

| | | |
|---|---|---|
| 0171110 | 7/1985 | European Pat. Off. . |
| 329375 | 8/1989 | European Pat. Off. . |
| 53-137231 | 11/1978 | Japan . |
| 59-176359 | 10/1984 | Japan . |
| 1307001 | 1/1970 | United Kingdom . |
| 80/00554 | 4/1980 | WIPO . |
| 9114747 | 10/1991 | WIPO . |
| 9306180 | 4/1993 | WIPO . |
| 95123133 | 12/1995 | WIPO . |

OTHER PUBLICATIONS

U.S. patent application Serial No. 07/847,401, filed Mar. 6, 1992.

New Materials/Japan, 1984 Elsevier Science Publishers B.V., p. 6.

*Primary Examiner*—Nasser Ahmad
*Attorney, Agent, or Firm*—William H. Pittman

[57] ABSTRACT

A coated article for foul release for use in aquatic applications does not require a discrete tie-layer to ensure adhesion of a coating to a substrate. An adhesion promoting layer comprising an anticorrosive material and a bonding agent is applied directly to the substrate. A release layer comprising organopolysiloxane is deposited onto the adhesion promoting layer. A method for applying the foul release coating comprises the following steps: applying an adhesion promoting layer, curing the adhesion promoting layer, applying the release layer and curing the release layer.

18 Claims, No Drawings

FOUL RELEASE SYSTEM

This invention was made with government support under Contract No. N61533-93-C-0062 awarded by the U.S. Government. The government has certain rights in this invention.

BACKGROUND

The present invention relates to an article for foul release for use in aquatic applications. More particularly, it relates to an article with a foul release coating that does not require the application of a discrete tie-layer to ensure adhesion of the foul release coating to the substrate. The present invention further relates to a method for applying foul release coatings.

Structures exposed to water, whether freshwater or sea water, often become encrusted with organisms. These structures include ship hulls, buoys, fish farming equipment, underwater and splash-zone surfaces of oil production platforms, and cooling water inlets and outlets of power stations. They can become encrusted with barnacles, tube worms, algae, and zebra mussels to name just a few of the organisms. This fouling negatively impacts the performance of these structures.

Use of foul release coatings has also been suggested to inhibit the adhesion of ice on the superstructure and topsides of ships.

Various coatings have been tried to reduce or eliminate fouling. Silicone coatings have been found to be effective. However, because of their excellent release characteristics, silicone coatings can be difficult to bond to substrates. Previous work has taught that a silicone coating adheres to a substrate if the substrate is first coated with a tie-layer. In U.S. application, Ser. No. 847,401, filed Mar. 6, 1992, which is available through NTIS, a three component foul release system is disclosed comprising at least one epoxy primer layer, a tie-layer and a silicone rubber release layer. Typically, several epoxy primer layers are applied. The final epoxy primer layer, often referred to as a mist coat, is typically a very thin layer applied to provide a clean, fresh surface to which the tie-layer can adhere. The tie-layer comprises an organopolysiloxane and a toughening component. The silicone rubber release layer comprises an organopolysiloxane, an alkyl silicate and a separate curing agent or catalyst. The epoxy primer layer(s) are applied directly onto the substrate. The tie-layer is applied onto the epoxy primer layer(s). The silicone coating release layer is then applied over the tie-layer after the tie-layer has partially cured.

In the prior art coating system, after each layer is applied, it must be allowed to cure. This typically takes approximately 24 hours. To completely coat a ship hull can take several days: 2–3 days for the 2–3 epoxy primer layers, 1 day for the epoxy mist coat, 1 day for the tie-layer, and 1 day for the silicone rubber release layer. It would be beneficial if some of the layers could be eliminated, thereby reducing the coating cycle time. The present invention reduces the total number of coats applied for foul release, thereby reducing the amount of material required and the cycle time.

In one aspect of the present invention, the several epoxy layers and the discrete tie-layer are replaced by a single layer comprising anticorrosive material and tie-layer. In another aspect of the present invention, the final mist coat and the discrete tie-layer are replaced by a single layer again comprising anticorrosive material and tie-layer.

SUMMARY OF THE INVENTION

In accordance with the present invention, there is provided an article for foul release for use in aquatic applications comprising:

a. a substrate, b. an adhesion promoting layer deposited onto said substrate, and, c. a release layer deposited onto said adhesion promoting layer, wherein said adhesion promoting layer comprises an anticorrosive material and a bonding agent.

In accordance with another aspect of the present invention, there is provided a method to apply a foul release coating for use in aquatic applications comprising the following steps:

applying an adhesion promoting layer onto a substrate, b. curing the adhesion promoting layer at room temperature for 48 hours or less, applying a release layer onto the adhesion promoting layer, and, d. curing the release layer at room temperature for at least 18 hours, wherein said adhesion promoting layer comprises an anticorrosive material and a bonding agent.

DESCRIPTION OF THE PREFERRED EMBODIMENTS

The composition of the present invention includes a substrate, an adhesion promoting layer and a release layer. The method of the present invention includes the steps of applying the adhesion promoting layer to a substrate, allowing it to cure for no more than 48 hours, applying the release layer, and allowing it to cure for at least 18 hours.

Any material that is used in an aquatic environment and is subject to fouling can be a substrate for the present invention. Possible substrates include boat building materials, such as stainless steel, aluminum, wood and resin-impregnated fiberglass and any other composite materials. Materials used for pipes such as concrete, plastic, steel and iron and other metals can also be coated. Water-holding tanks, including swimming pools, are subject to fouling. The materials used to manufacture tanks include the same or similar materials as those used for pipes.

The substrate may or may not be coated with an anticorrosive layer prior to application of an adhesion promoting layer. The anticorrosive layer comprises anticorrosive material which includes any material which inhibits the corrosion, or degradation, of the substrate due to reaction with its environment. Such anticorrosive materials are well known in the art. They include a two part material comprising an epoxy functionalized base material and a curing catalyst. The anticorrosive layer is typically 0.10 to 0.75 mm thick.

Suitable bonding agents include a moisture curable grafted copolymer that further comprises polydialkylsiloxane and one or more ethylenically unsaturated monomers. Preferably, the polydialkylsiloxane comprises polydimethylsiloxane. One or more ethylenically unsaturated monomers are grafted onto the polydialkylsiloxane by a free radical process. Suitable ethylenically unsaturated monomers include butyl acrylate, styrene, vinyl chloride, and vinylidene chloride. A commercially available moisture curable grafted copolymer is marketed by Wacker-Mexicana, under the trade name Silgan® J501.

If the bonding agent comprises a moisture curable grafted copolymer and the adhesion promoting layer is to be applied onto an anticorrosive layer, the adhesion promoting layer comprises 85–95% by weight moisture curable grafted copolymer with the balance being anticorrosive material. Preferably, the adhesion promoting layer comprising moisture curable grafted copolymer is applied directly onto the substrate and no anticorrosive layer is used. In that case, the adhesion promoting layer comprises 2–10% by weight moisture curable grafted copolymer with the balance being anticorrosive material. In either case, the thickness of the adhesion promoting layer can be 0.10 to 0.75 mm.

The bonding agent can also comprise aminofunctionalized polysiloxane fluids. Such aminofunctionalized polysiloxane fluids are represented by Formula I and Formula II.

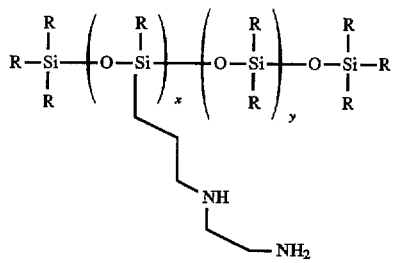

where x/y=0.05–0.5; R=CH$_3$, C$_a$H$_{2a+1}$ and a=1–10.

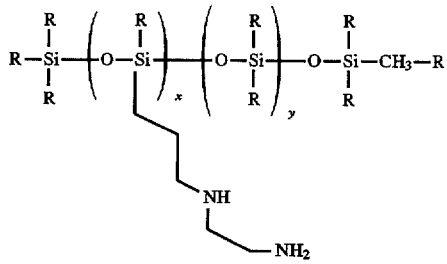

where x/y=0.05–0.5; R=CH$_3$, C$_a$H$_{2a+1}$ and a=1–10.

Aminofunctionalized polysiloxane fluids include materials marketed by GE Silicones under the tradenames SF1708 and SF1927.

When the adhesion promoting layer includes aminofunctionalized polysiloxane fluids, the aminofunctionalized polysiloxane fluids and anticorrosive material are mixed in proportions such that there is no visible phase separation and the two materials appear homogeneously mixed. Preferably the adhesion promoting layer comprises 20% by weight or less aminofunctionalized polysiloxane fluid, with the balance comprising anticorrosive material. The thickness of the adhesion promoting layer is 0.10 to 0.75 min.

A third material can be utilized as a bonding agent in the present invention. The bonding agent can comprise α, ω-diaminofunctionalized polysiloxane fluids of Formula III and IV.

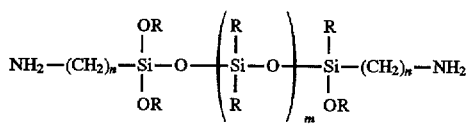

where R=CH$_3$, C$_a$H$_{2a+1}$, n=1, 2, 3, 4, . . . . 18; m='–100 and a=1–10.

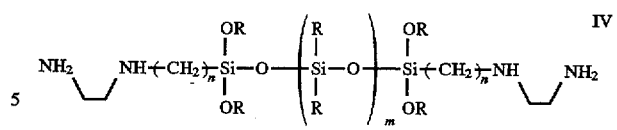

where R=CH$_3$, C$_a$H$_{2a+1}$; n=1, 2, 3, 4, . . . . 18; m=3–100 and a=1–10.

When the adhesion promoting layer includes α, ω-diaminofunctionalized polysiloxane fluids, the α, ω-diaminofunctionalized polysiloxane fluids and anticorrosive material are mixed in proportions such that there is no visible phase separation and the two materials appear homogeneously mixed. Preferably the adhesion promoting layer comprises 20% by weight or less α, ω-diaminofunctionalized polysiloxane fluid, with the balance comprising anticorrosive material. The thickness of the adhesion promoting layer is 0.10 to 0.75 mm.

When the bonding agent comprises aminofunctionalized polysiloxane fluids or α, ω-diaminofunctionalized polysiloxane fluids, it is preferable to apply an anticorrosive layer before applying the adhesion promoting layer. This ensures protection from corrosion.

Solvent may be mixed into the adhesion promoting layer to make the adhesion promoting layer easier to apply to the substrate. The adhesion promoting layer can include up to 20% by weight solvent with the balance being bonding agent and anticorrosive material. There are many solvents that are appropriate. They are well known in the art. Such solvents include naphtha, mineral spirits, isopropanol, xylene, and toluene. Experiments have shown butanol is not an effective solvent.

The release layer comprises 0–20% by weight moisture cured grafted copolymer with the balance being organopolysiloxane. Suitable organopolysiloxanes are well known in the art. Preferably, the organopolysiloxane is a two part, room temperature vulcanized, condensation cured polydimethylsiloxane. It can be filled with materials such as fumed silica and calcium carbonate. Preferably, the vulcanization is catalyzed with tin or with titanium. Most preferably, the release layer contains no moisture curable grafted copolymer and consists essentially of organopolysiloxane. The release layer is 0.25 mm to 0.75 mm thick.

Each layer, the anticorrosive layer, the adhesion promoting layer and the release layer, can be applied by methods well known in the art. Such methods include brushing, spraying, dipping, rolling or any means normally used to apply paint.

If an anticorrosive layer is applied to the substrate, it is cured at ambient temperature and humidity until it is dry to the touch. Preferably, the anticorrosive layer is cured for at least 24 hours at 20°–30° C. and 40–60% relative humidity.

After application of the adhesion promoting layer onto the substrate, it is cured for 48 hours or less at ambient temperature and humidity. Preferably, the adhesion promoting layer is cured for 24 hours or less at 20°–30° C. and 40–60% relative humidity. If the adhesion promoting layer includes aminofunctionalized polysiloxane fluids or α, ω- diaminofunctionalized polysiloxane fluids, it is more preferred that the adhesion promoting layer is cured for 6 hours or less at 20°–30° C. and 40–60% relative humidity.

The release layer is applied directly to the adhesion promoting layer. The release layer is cured for at least 18 hours at ambient temperature and humidity. Preferably, the release layer is cured for at least 24 hours at ambient temperature and humidity. More preferably, the release layer is cured for at least 72 hours at 20°–30° C. and 40–60% relative humidity.

If the release layer is cured for less than 72 hours, the adhesion promoting layer preferably comprises 6–10% by weight moisture curable grafted copolymer, with the balance being anticorrosive material. More preferably, the release layer is cured for 72 hours or more, in which case, the adhesion promoting layer comprises 2–10% by weight moisture curable grafted copolymer, with the balance being anticorrosive material.

The following examples are presented to enable those skilled in the art to understand more clearly and practice the present invention. The examples should not be considered as a limitation upon the scope of the present invention, but merely as being illustrative and representative thereof.

EXAMPLE

Steel plates were coated with various coating compositions, using the materials detailed in the following table. The coating layers were applied by either brushing or spraying. If an anticorrosive material was used, in each case it was 0.25 mm thick. The adhesion promoting layer was also 0.25 mm thick. The release layer was 0.41 mm thick in each example. Curing of each layer was carried out at 24° C. and 50% relative humidity for the length of time indicated in the table.

The adhesion of each coating composition was tested by a finger peel test wherein the tester attempts to remove the coating from the steel plate by peeling it off with a fingernail. The coating was considered to have failed if there was an adhesive failure between any layer and another layer or between a layer and the substrate. The coating was considered to have passed if there was only a cohesive failure within an individual layer and no adhesive failure between layers.

Examples 1 through 13 are detailed in the following table. In Example 1, without an adhesion promoting layer between them, the release layer did not adhere to the anticorrosive layer. Similarly, when only moisture curable grafted copolymer is applied directly to the substrate without any anticorrosive material, as it was in Example 2, the moisture curable grafted copolymer does not adhere to the substrate. Examples 3 through 6 detail the need for sufficient moisture curable grafted copolymer in the adhesion promoting layer. If the release layer is cured for less than 72 hours, more than 5% moisture curable grafted copolymer must be incorporated into the adhesion promoting layer for good adhesion. The amount of moisture curable grafted copolymer can be reduced if the release layer is allowed to cure for at least 72 hours, as shown in Example 5. The coating adheres well when moisture curable grafted copolymer is included in the release layer, as well as in the adhesion promoting layer. This is demonstrated in Example 7. However, as Example 8 shows, if the moisture curable grafted copolymer is only included in the release layer, the resultant coating does not adhere to a layer of anticorrosive material with no moisture curable grafted copolymer in it. The filler in the organopolysiloxane of the release layer can be calcium carbonate, as it is in the RTV11 of Example 9, or fumed silica filled, as it is in the Exsil® 2200 silicone rubber of Example 4. The moisture curable grafted copolymer in the adhesion promoting layer must comprise a moisture curable grafted copolymer with polydialkylsiloxane and one or more ethylenically unsaturated monomers. Example 10 indicates that using an ungrafted polyorganosiloxane, such as Exsil 2200 silicone rubber, in the adhesion promoting layer does not produce an adherent coating. The adhesion promoting layer does not have to be applied directly to the substrate, it also adheres well to a layer of anticorrosive material, as shown in Example 11. However, more moisture curable grafted copolymer is required in the adhesion promoting layer. In Example 11, the adhesion promoting layer contains 90% J501 silicone. Example 12 describes the use of aminofunctionalized polysiloxane fluid, SF 1708 silicone, as a bonding agent. Example 13 details the use of α, ω-diaminofunctionalized polysiloxane fluid. Untilled epoxy can also be used as an anticorrosive material, as detailed in Example 14.

| | Anticorrosive Layer | Cure hrs. | Adhesion Promoting Layer | Cure hrs. | Release Layer | Cure hrs. | Application Method | Adhesion Results |
|---|---|---|---|---|---|---|---|---|
| Control 1 | Seaguard 150 | 3 | — | — | Exsil 2200 | 18 | Spray | Fail |
| Control 2 | — | — | J501 | 3 | Exsil 2200 | 18 | Spray | Fail |
| Control 3 | — | — | 95% Seaguard 150 5% J501 | 3 | Exsil 2200 | 18 | Spray | Fail |
| 4 | — | — | 90% Seaguard 150 10% J501 | 3 | Exsil 2200 | 18 | Spray | Pass |
| 5 | — | — | 97.5% Seaguard 2.5% J501 | 3 | Exsil 2200 | 72 | Brushed | Pass |
| 6 | — | — | 95% Seaguard 5% J501 | 3 | Exsil 2200 | 72 | Brushed | Pass |
| 7 | — | — | 90% Seaguard 10% J501 | 3 | 90% Exsil 2200 10% J501 | 18 | Brushed | Pass |
| Control 8 | Seaguard 150 | 3 | — | — | 90% Exsil 2200 10% J501 | 18 | Spray | Fail |
| 9 | — | — | 90% Seaguard 150 10% J501 | 3 | RTV11 | 18 | Spray | Pass |
| Control 10 | — | — | 10% Exsil 2200 90% Seaguard 150 | 3 | Exsil 2200 | 18 | Spray | Fail |
| 11 | Seaguard 151 | 24 | 10% Seaguard 151 | 3 | Exsil 2200 | 18 | Spray | Pass |

|  | Anticorrosive Layer | Cure hrs. | Adhesion Promoting Layer | Cure hrs. | Release Layer | Cure hrs. | Application Method | Adhesion Results |
|---|---|---|---|---|---|---|---|---|
| 12 | Amerlock 400 Al | 24 | 90% J501 90% Amerlock 400 Al 10% SF 1708 | 6 | Exsil 2200 | 48 | Brushed | Pass |
| 13 | Amerlock 400 Al | 24 | 90% Amerlock 400 Al 10% α,ω diamino funct. fluid | 6 | Exsil 2200 | 24 | Brushed | Pass |
| 14 | Amerlock 400 | 24 | 80% Amerlock 400 20% SF 1708 | 4 | Exsil 2200 | 24 | Sprayed | Pass |

Seaguard 150, an epoxy polyamide, is a product of Seagrave Coatings Corp. of VA, 4030 Seaguard Avenue, Portsmouth, VA 23701
Exsil 2200, a tin catalyzed, condensation cured fumed silica filled RTV silicone, is a product of GE Silicones, 260 Hudson River Road, Waterford, NY 12188
J501, a moisture curing silicone, is a product of Wacker-Mexicana, S.A. de C.V., Av. Periferico Sur 3343PH, 10200, Mexico, D.F.
Amerlock 400 Al, an aluminum filled epoxy, is a product of Valspar Corp., 1101 Third Street South, Minneapolis, MN 55415
RTV11, a tin catalyzed, CaCO$_3$ filled RTV silicone, is a product of GE Silicones, 260 Hudson River Road, Waterford, NY 12188
Seaguard 151, an epoxy-polyamide, is a product of Seagrave Coatings, Corp. of VA, 4030 Seaguard Avenue, Portsmouth, VA 23701
SF 1708, an aminofunctionalized polysiloxane fluid, is a product of GE Silicones, 260 Hudson River Road, Waterford, NY 12188
Amerlock 400, an unfilled epoxy, is a product of Valspar Corp., 1101 Third Street South, Minneapolis, MN 55415

What is claimed is:

1. A foul release article for use in aquatic applications comprising:
   a. a substrate,
   b. an adhesion promoting layer on said substrate, and
   c. a release layer in direct contact with said adhesion promoting layer,
   wherein said adhesion promoting layer comprises an anticorrosive material and a bonding agent, said anticorrosive material comprises an epoxy functionalized base material and a curing catalyst and said release layer comprises an amount upto 20% by weight moisture cured grafted copolymer with the balance being organopolysiloxane.

2. An article in accordance with claim 1, wherein said adhesion promoting layer comprises 2–10% by weight bonding agent, said bonding agent comprising a moisture curable grafted copolymer further comprising polydialkylsiloxane and at least one ethylenically unsaturated monomer, with the balance being anticorrosive material.

3. An article in accordance with claim 2, wherein said polydialkylsiloxane comprises polydimethylsiloxane and said ethylenically unsaturated monomers comprise butyl acrylate and styrene.

4. An article in accordance with claim 1, wherein said adhesion promoting layer comprises bonding agent and anticorrosive material, said bonding agent further comprising an aminofunctionalized polysiloxane fluid, wherein the aminofunctionalized polysiloxane fluid and anticorrosive material are mixed in proportions such that a homogeneous mixture results.

5. An article in accordance with claim 1, wherein said adhesion promoting layer comprises bonding agent and anticorrosive material, said bonding agent further comprising α, ω-diaminofunctionalized polysiloxane fluid, wherein the α, ω-diaminofunctionalized polysiloxane fluid and anticorrosive material are mixed in proportions such that a homogeneous mixture results.

6. An article in accordance with claim 1, wherein said adhesion promoting layer is 0.10 to 0.75 mm thick.

7. An article in accordance with claim 1, wherein said organopolysiloxane comprises a two-part, room temperature vulcanized, condensation cured polydimethylsiloxane.

8. An article in accordance with claim 7, wherein said organopolysiloxane is tin catalyzed.

9. An article in accordance with claim 7, wherein said organopolysiloxane is titanium catalyzed.

10. An article in accordance with claim 1, wherein said release layer consists essentially of a two-part, room temperature vulcanized, condensation cured polydimethylsiloxane.

11. An article in accordance with claim 1, wherein said moisture curable grafted copolymer comprises polydialkylsiloxane and one or more ethylenically unsaturated monomers.

12. An article in accordance with claim 1, wherein said release layer is 0.25–0.75 mm thick.

13. A foul release article for use in aquatic applications comprising:

a substrate, an anticorrosive layer on said substrate, an adhesion promoting layer on said anticorrosive layer, and a release layer in direct contact with said adhesion promoting layer, wherein said adhesion promoting layer comprises an anticorrosive material and a bonding agent, said anticorrosive material comprises an epoxy functionalized base material and a curing catalyst, and said release layer comprises an amount upto 20% by weight moisture cured grafted copolymer with the balance being organopolysiloxane.

14. An article in accordance with claim 13 wherein said anticorrosive layer comprises anticorrosive material, and is 0.10 to 0.75 mm thick.

15. An article in accordance with claim 14, wherein the anticorrosive layer comprises an epoxy functionalized base material and a curing catalyst.

16. An article in accordance with claim 15, wherein said adhesion promoting layer comprises 85–95% moisture curable grafted copolymer, with the balance being anticorrosive material.

17. An article in accordance with claim 15, wherein said adhesion promoting layer comprises bonding agent and anticorrosive material, said bonding agent further comprising aminofunctionalized polysiloxane fluid, wherein the aminofunctionalized polysiloxane fluid and anticorrosive material are mixed in proportions such that a homogeneous mixture results.

18. An article in accordance with claim 15, wherein said adhesion promoting layer comprises bonding agent and anticorrosive material, said bonding agent further comprising α, ω-diaminofunctionalized polysiloxane fluid, wherein the α, ω-diaminofunctionalized polysiloxane fluid and anticorrosive material are mixed in proportions such that a homogeneous mixture results.

* * * * *